United States Patent Office.

ROBERT GNEHM AND JAKOB SCHMID, OF BASLE, SWITZERLAND, ASSIGNORS TO THE SOCIETY OF CHEMICAL INDUSTRY, OF SAME PLACE.

GRAY COLORING-MATTER.

SPECIFICATION forming part of Letters Patent No. 413,050, dated October 15, 1889.

Application filed May 16, 1889. Serial No. 311,042. (Specimens.) Patented in France April 18, 1888, No. 190,067.

*To all whom it may concern:*

Be it known that we, ROBERT GNEHM and JAKOB SCHMID, citizens of Switzerland, residing at Basle, in the Canton of Basle, Switzerland, have invented new and useful Improvements in Gray Coloring-Matters, (for which Letters Patent have been granted to us in France, bearing date April 18, 1888, No. 190,067,) of which the following is a specification.

This invention is based on the discovery that metaoxydiphenylamine, which was first described by V. Merz and W. Weith, (*Berichte der deutschen chemischen Gesellschaft,* XIV, 1881, page 2,345,) when transformed into a phenylized derivative of meta-amidophenolphthaleine, produces coloring-matters which have the same relation to the ordinary meta-amidophenolphthaleine as the rosaniline blue has to fuchsine.

The gray coloring-matter which forms the subject-matter of our present application for a patent is produced by the reaction of tetrachlorophthalic acid on metaoxydiphenylamine in the presence of chloride of zinc or another condensing agent at a temperature of from 180° to 210° centigrade.

In carrying out our invention we can proceed as follows: Seven kilograms of metaoxydiphenylamine, six kilograms of tetrachlorophthalic acid, and eight kilograms of chloride of zinc are mixed together and heated during five hours at a temperature of from 180° to 210° centigrade. The molten mass, which is at first semi-fluid, soon becomes solid. The glass-like melt, when cold, is finely pulverized and repeatedly boiled out with diluted hydrochloric acid, diluted soda-lye, and water, and finally the coloring-matter is obtained in a pure state by extraction from alcohol.

The coloring-matter is obtained in the form of a dark-green powder, and it forms phenyl-meta-amidophenoltetrachlorphthaleine. It is somewhat difficultly soluble in hot alcohol with a grayish-blue tint. The dyes on silk are of a gray color, showing a strong fluorescence.

The formula of this coloring-matter is as follows:

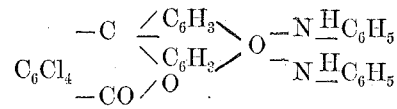

What we claim as new, and desire to secure by Letters Patent, is—

As a new product, the gray coloring-matter or dye-stuff, phenylmeta-amidophenoltetrachlorphthaleine, which forms a dark-green powder insoluble in water, difficultly soluble in hot alcohol, still more difficultly soluble in benzine, and which dyes silk with a gray color, showing a strong fluorescence.

In testimony whereof we have hereunto set our hands and seals in the presence of two subscribing witnesses.

ROBERT GNEHM. [L. S.]
JAKOB SCHMID. [L. S.]

Witnesses:
GEORGE GIFFORD,
ED. BRASELMANN.